(12) United States Patent
Chien

(10) Patent No.: US 7,318,653 B2
(45) Date of Patent: Jan. 15, 2008

(54) MULTIPLE FUNCTION WALL COVER PLATE

(76) Inventor: Tseng-Lu Chien, 8F, No. 29, Alley 73, Lin-Shen Road, Shi-Chi Town, Taipei Hsang (TW)

( * ) Notice: Subject to any disclaimer, the term of this patent is extended or adjusted under 35 U.S.C. 154(b) by 38 days.

(21) Appl. No.: 11/094,156

(22) Filed: Mar. 31, 2005

(65) Prior Publication Data

US 2006/0073731 A1    Apr. 6, 2006

Related U.S. Application Data

(63) Continuation-in-part of application No. 10/954,189, filed on Oct. 1, 2004, now abandoned.

(51) Int. Cl.
*F21V 33/00* (2006.01)
(52) U.S. Cl. .......................................... 362/95; 362/96
(58) Field of Classification Search .................. 362/95, 362/641–644; 392/392–394
See application file for complete search history.

(56) References Cited

U.S. PATENT DOCUMENTS

| | | | | |
|---|---|---|---|---|
| 5,481,442 A | * | 1/1996 | Dickie et al. | 362/95 |
| 6,474,829 B2 | * | 11/2002 | Clodfelter | 362/95 |
| 6,478,440 B1 | * | 11/2002 | Jaworski et al. | 362/96 |
| 2004/0247300 A1 | * | 12/2004 | He et al. | 392/390 |
| 2005/0094988 A1 | * | 5/2005 | Yip et al. | 392/395 |

* cited by examiner

*Primary Examiner*—Thomas M. Sember
*Assistant Examiner*—Julie A. Shallenberger
(74) *Attorney, Agent, or Firm*—Bacon & Thomas, PLLC

(57) ABSTRACT

A multiple function wall cover plate includes a night light, air freshener, and receptacles that replace the existing wall cover plate by single screw disassembly and that can be fastened again in seconds without any risk of contacting hot wires. The user can simply plug the multiple function wall cover plate's prong into the original wall outlet's receptacle to enable electricity delivery and enjoy the multiple functions of the current invention.

11 Claims, 5 Drawing Sheets

MULTIPLE FUNCTION WALL COVER PLATE

This is the C.I.P filing case of the co-inventor's Ser. No. 10/954,189, filed Oct. 1, 2004 now abandoned for Electro-Luminescent wall cover plate.

BACKGROUND

A multiple function wall cover plate has been disclosed in several prior patents, including U.S. Pat. Nos. 6,714,725, 6,810,204, 6,832,794, and 6,839,506, but the prior multiple function wall cover plates have a relatively thick housing and are very dangerously to children because the chemical refill can easily be removed. The current invention uses a screw to security lock all components and prevent children from touching chemical containing components. In addition, whereas the thicker body of the prior multiple function wall cover plates are too ugly because the multiple function components are added-on the existing wall cover plate, the current invention's concept is to replace the existing wall cover plate so that the thickness will be much less than that of the prior art. In particular, the current invention uses a conventional commercially available refill component which has the dimension 6.5 cm (Length)×3.5 cm (Width)× 0.8 cm (High) and simply installs it on the back housing to reduce thickness and improve appearance.

The current invention incorporates (1) an air freshener, and (2) a nightlight, which may include an electro-luminescent (E.L.) element, LED, incandescent light, fiber optics, a fluorescent light, or a black tube, and related circuitry for the light source, and (3) a receptacle arrangement (which may include any number of receptacles) to let the wall cover plate offer the best functions to consumers.

Other prior art includes U.S. Pat. Nos. 6,716,256; 6,657,380; 6,642,452; 6,413,598; 6,388,345; 6,342,995; 6,089,893; 6,086,211; 6,050,716; 5,934,451; 5,899,549; 5,842,763; 5,683,166; 5,670,776; 5,660,459; 5,637,930; 5,586,879; 5,544,025; 5,485,356; 5,407,721; 5,117,734; 4,924,349; 4,774,641; 4,755,913; 4,739,187; 4,617,613; 4,546,419; 4,514,789; 4,255,780; 4,240,090; 4,038,582; and 3,895,225, as well as the Inventor's prior U.S. Pat. Nos. 6,280,053; 6,171,117; 6,170,958; and 6,183,101. None of these prior art patents discloses a multiple function wall cover plate having a plurality of functions including (1) fragrance(s), (2) receptacle(s), and (3) nightlight(s) to easily replace the original wall outlet's cover plate and provide electricity delivery from the prong(s) of the multiple functions wall cover plate as in the current invention described below, and in particular, a multiple function wall cover plate having the shape and thickness of an existing wall outlet and a safety screw to prevent children from touching any parts of a refill, the nightlight, or the receptacle.

DRAWINGS

FIGS. 1-1 is a side-view showing the construction of an alternative spatial arrangement of the current invention.

FIGS. 2-1 and 2-2 are a front view and back view of the preferred embodiment of FIGS. 1-1.

DETAIL DESCRIPTION

Figure 2:
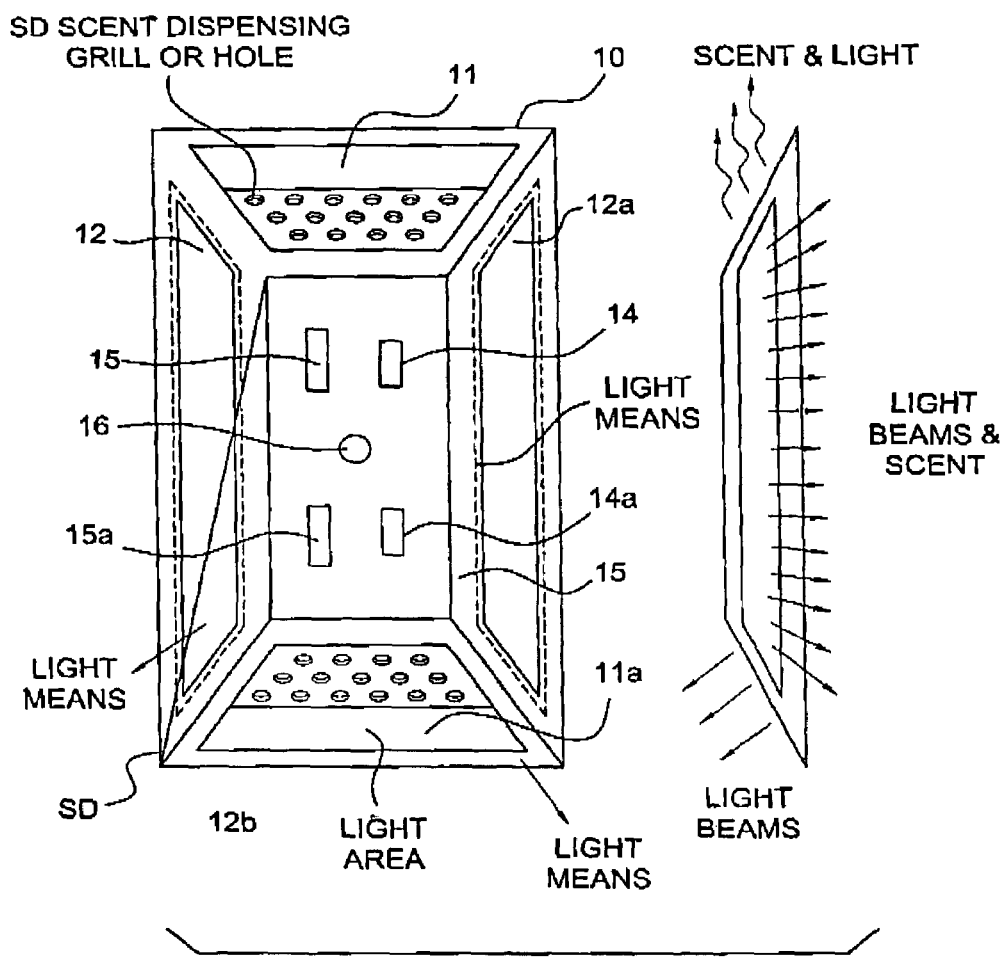
FIG. 2 is a front view showing scent flowing and light beam emitting directions of the preferred multiple function wall cover plate.
Figure 2:
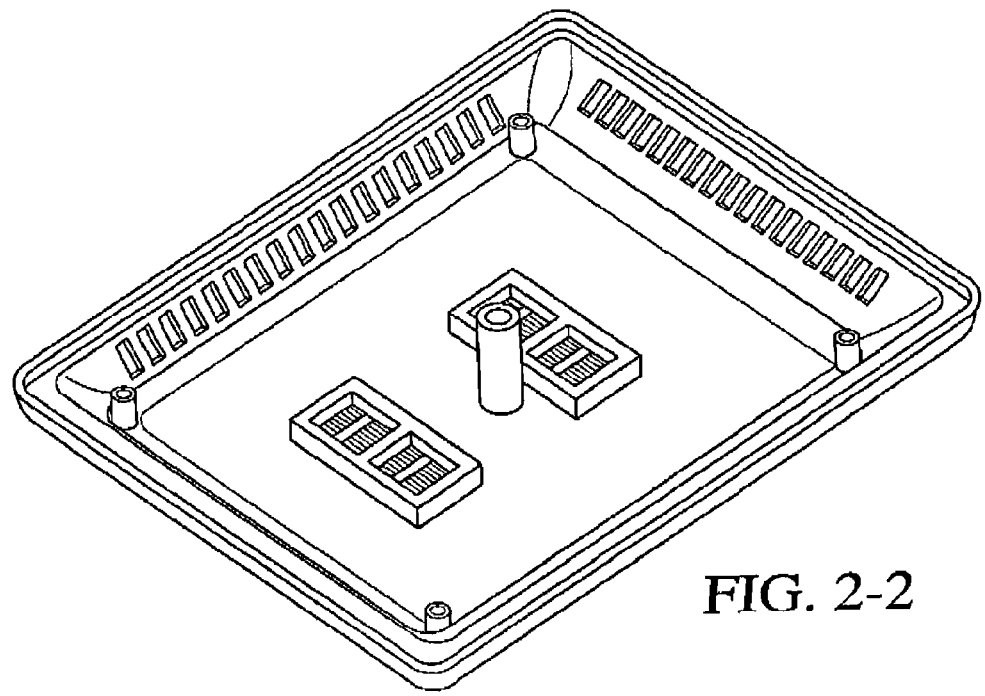
Figures 1, 2:
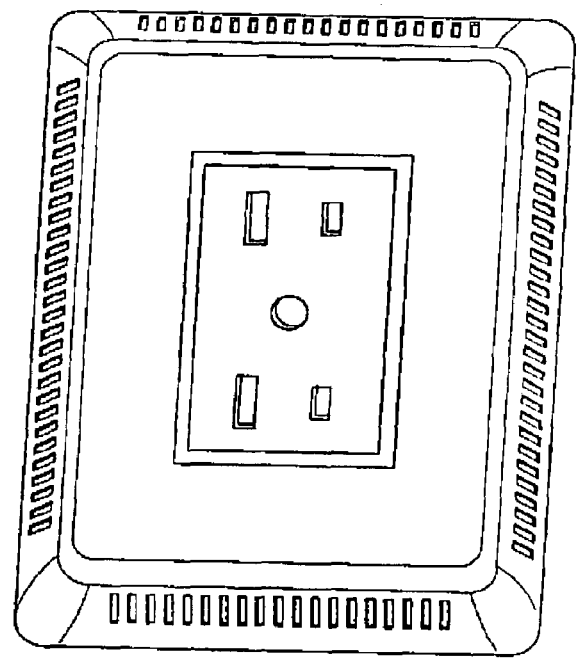

The multiple function wall cover plate (10) of FIG. 2 has at least one ventilation area (11) (11a) to allow the inside refill's fragrance (not shown) to be spread out to the environment, and at least one nightlight area (12) (12a) (12b) that incorporates a light source which may be selected from the group consisting of an electro-luminescent (EL) element, LED, incandescent light, neon light, fluorescent tube, black tube, gas filled light source, or any equivalent light source to offer a nightlight function. The light source is preferably connected to the power source by prongs, contact means (15) (15a), and circuit means (not shown). The multiple function wall cover plate includes at least one pair of receptacles (14) (14a) to keep the existing wall outlet functions without reducing the number of receptacles while adding multiple functions to the wall cover plate.

The multiple function wall cover plate has a center screw hole (18) to allow the multiple function wall cover plate to be securely fastened by a screw though the original outlet's screw hole and replace the original outlet's wall cover plate. The multiple function wall cover plate also has at least one pair of prong sets which can be easily inserted into the original wall outlet's receptacle and supply electricity from the original wall outlet to the multiple function wall cover plate's receptacle or receptacle(s) which, depending on market requirements, may be arranged to number from two receptacles to any number of receptacles by simply varying the inner copper-piece design to provide the desired number of receptacles.

Figure 1:
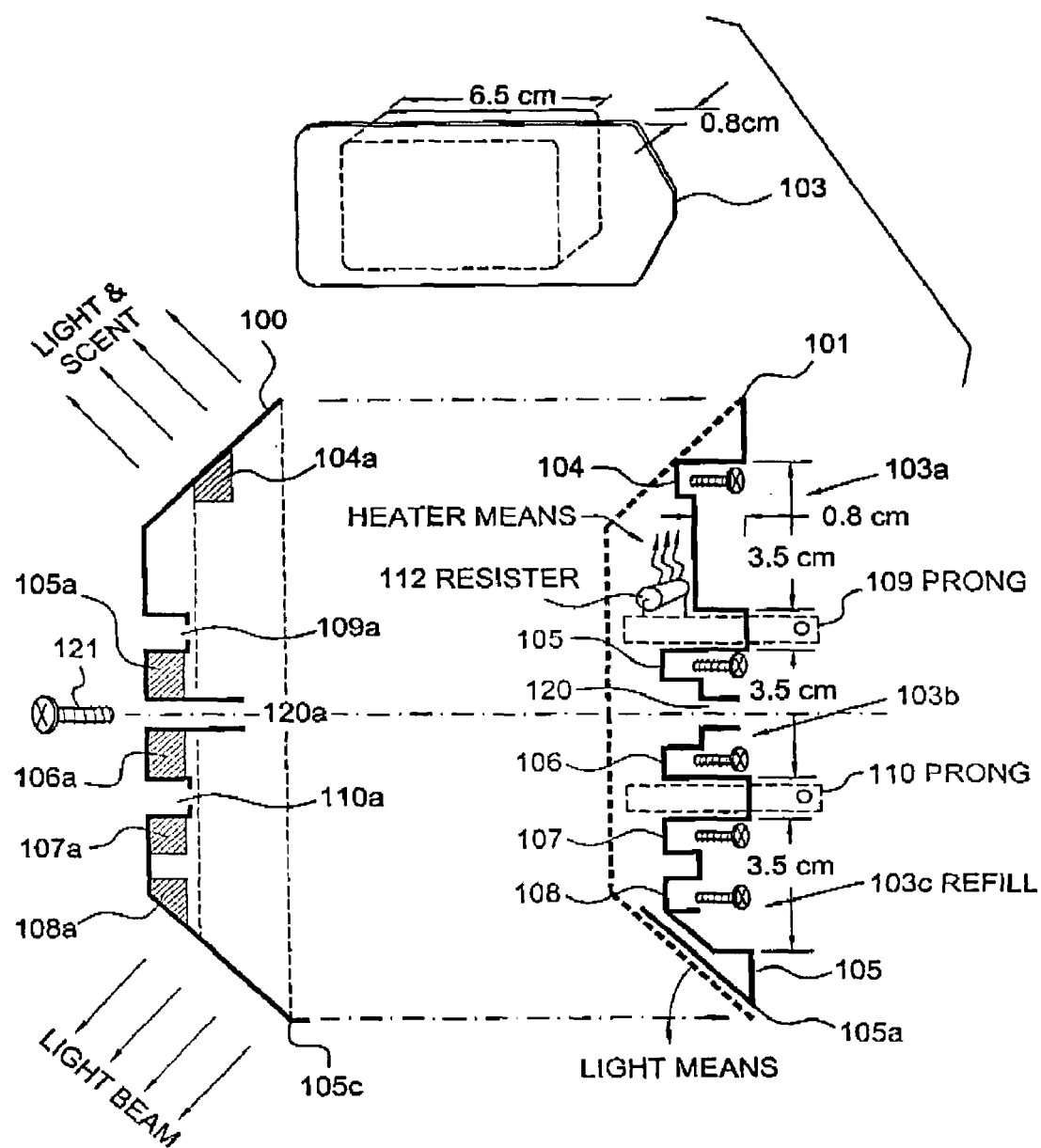
FIG. 1 is a side-view of showing the front cover and back base of a preferred embodiment of the current invention.
Figure 1:
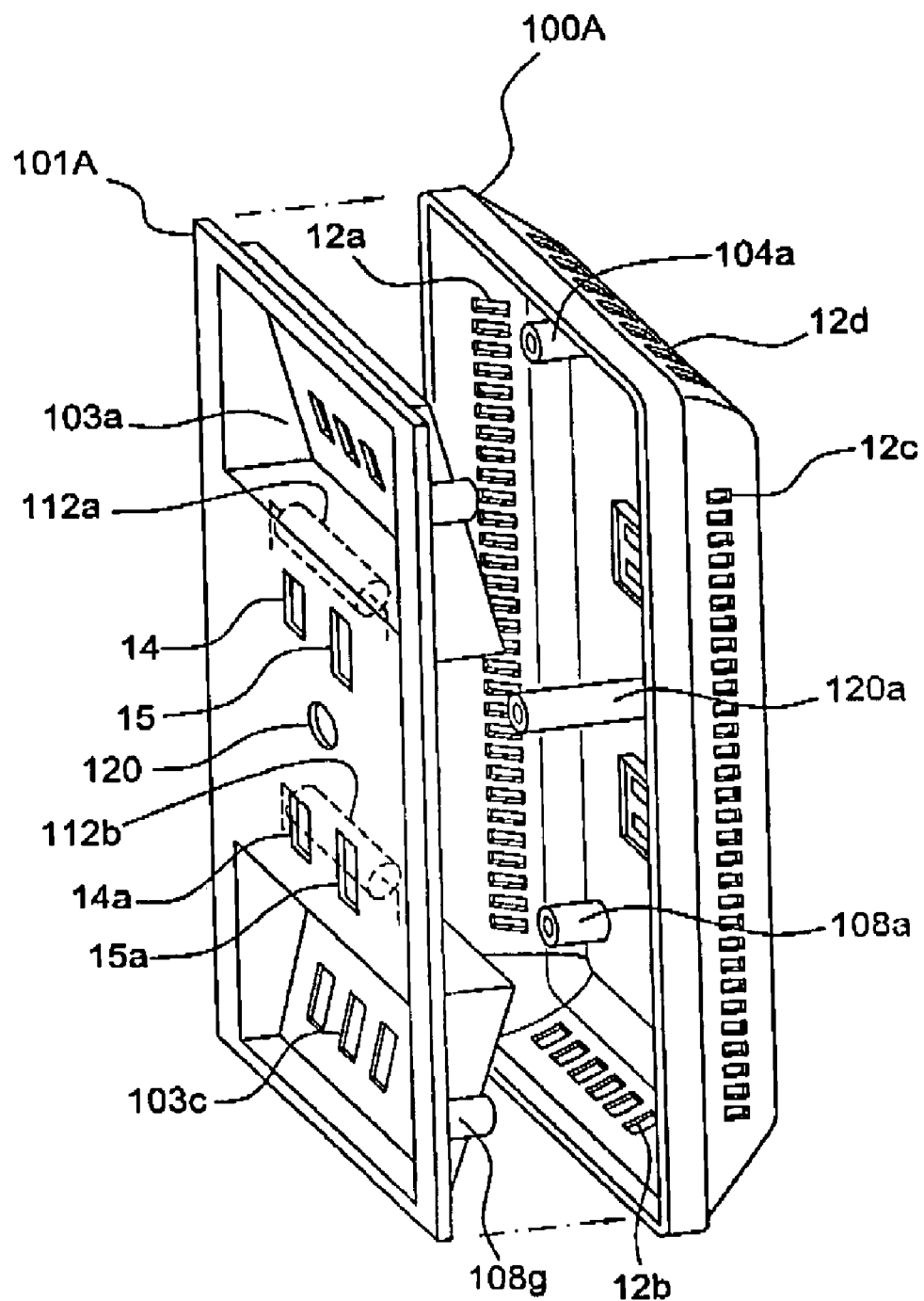

As shown in FIG. 1, the front cover (100) and back base (101) are positioned and fastened by screws (104b) (105b) (106b) (107b) (108b) through the passages (104) (105) (106) (107) (108) and held by the plastic posts (104a) (105a) (106a) (107a) (108a). The back base (101) has at least one groove having dimensions of 3.5 cm×6.5 cm located at preferred locations (103a) (103b) (103c) to allow the refill (103) to fit into the back base (101). The copper means (109) (110) are configured to allow current delivery from the original receptacle to the multiple function wall cover plate's receptacle. Delivery may be from one original receptacle to multiple receptacles, for examples from 1 original receptacle to 1 or 2 or 3 . . . etc. receptacles. The copper means may be of a commercially available type. Because the back base (101) replaces the original wall outlet's cover, the back base (101) can be attached the wall outlet's receptacle surface as close as possible to reduce the overall height and get the best and thinnest thickness and appearance. The front cover (100) has a hole (120a) to allow the screw (121) to pass though the hole (120) in the back base to fasten on the original wall outlet's screw holder (not shown). The copper means (109) (110) are well installed within the channels (109a) (110a) to meet the safety standard and are not reachable by consumer. The refill (103) may be located at a top (103a), middle (103b), or bottom (103c) position, preferably as long as the width of the groove is at least 3.5 cm so that more than 1 refill can be installed to provide the longest and strongest fragrance dispenser result relative to any other prior art devices. At least one heater means (112) may be arranged on the top of a pair of the cooper means (109) or (110) so as to use the copper means to provide electricity and produce heat, thereby causing air in front of the refill surface to move up and let the refill's fragrance spread out as widely as possible while the electricity is connected. At least one light source (not shown) is well arranged within the gaps (105a) within a support board (105) sealed inside the back base to prevent contact with the consumer and hold the light source at a perfect location. The light source may be selected from any combination of an electro-luminescent (E.L.) element, LED, fluorescent tube, black light, neon light, and/or other equivalent light means and related circuit means. The light source can be arranged at various locations according to market and technical requirements. For example, the light source can include the light sources described in the Inventor's U.S. Pat. Nos. 6,170,958 and 6,171,117, which use resilient conductive means of rubber or metal material or with extra conductive means such as wire, metal panel, strips, terminals to deliver electricity to the light source(s) means via copper mean(s). These skills are available from the Inventor's earlier patents and other prior art.

The preferred embodiment of the multiple function wall cover plate discussed above, which replaces the original wall outlet's wall plate, not only offers an air freshener dispenser function but also offers a nightlight, multiple receptacles, and more than one refill compartment within a compact space with quick electrical connection accomplished by simply inserting the current invention's copper means into the original wall outlet's receptacle(s) without touching any hot wires. The preferred embodiment is, however, only one example and is not intended to be limiting. Advantages of the preferred embodiment include: (a) The wall cover plate has a configuration similar to that of the existing wall outlet cover plate. (b) The current invention's wall cover plate has a most compact thickness to allow a commercially available refill to be well installed without creating a new refill to cause the consumer to purchase a variety of refills. (c) The fragrance, light source, and receptacle(s) are all sealed within the front cover and back base. Furthermore, alternative or optional features may including such as: (1) The current receptacles may range in number from 2 receptacle(s) increase to any number of receptacles such as 3,4,5,6 . . . N. (2) The refill number can be increased from 1 to 2,3,4,5, . . . N. (3) The copper means/conductive means can be designed to provide a desired receptacle number (4) The front cover and back base can be made into a certain number of pieces that provide a curved shape or appearance. (5) The seal means for the front cover and back base can be selected from a screw(s), glue, sonic sealing, hot sealing, chemical sealing, catch and hook, notch, melting, or any other conventional sealing arrangement. (6) The light source may be selected from any combination of an E.L element, LED, incandescent bulb, neon light, fluorescent tube, black light, gas filled bulb, halogen lamp, or an equivalent light with desired brightness and power consumption. (7) The electric connection between the light means may be any conductive means or combination thereof, including resilient conductive means such as conductive rubber or a conductive spring, metal piece, wire, copper strips, bracket, metal plate or any combination with a clip, soldering, rivet, welding, snapping or equivalent procedure to deliver electricity from one end to the other ends. (8) The functions can be increased or reduced depend on market requirements. In addition, provision of less than the current three major functions of fragrance, nightlight, and receptacles may still fall within the current invention scope. For example, one may replace any one of the receptacle(s), nightlight(s), fragrance(s) functions with other functions or components such as a time piece(s), bug repelled device(s), blue tooth electric controller(s), remote controller(s), infrared sensor(s), and/or other electric related device(s) and still fall within the scope of invention, which is a multiple functions wall cover plate that replaces an original wall outlet plate. For a new building or house, the builder can adapt the multiple function wall cover plate of the current invention to provide a high-tech addition that greatly increases the house value.

FIG. (1-1) shows an alternative design for the back case (101A) with only two refill compartments (103a) and (103c). Two wider prong holes (15) (15a) are located on the left side of the back case. The two narrow prong holes (14) (14a) are located on the right side of the back case. The central screw (not shown) can pass though the plastic tunnel (120a) and opening (120) to fasten with the outlet device's screw holder (not shown). The refill compartment (103a) (103c) may have a lot of openings, cutouts, windows, holes, or grills to allow the refill's scent to pass through the back case (101A) to front cover (100A) and spread out from the front cover's grills, openings, cutout, windows, windows, and/or holes (12a) (12b) (12c) (12d) as quickly as possible. The heater means (112a) (112b) may be installed adjacent to the prong means (not shown) so provide electricity to cause hot air to flow up and bring the scent to a wider area. One or more heater means can be provided depending on market requirements. The light means can be installed within the front cover and back case with proper installation means.

FIGS. 2-1 and 2-2 show details of the preferred front cover (10) with alternative openings, grills, windows, cut-outs to allow the scent or smell of the refill to spread out quickly. These openings, grills, windows, or cutouts also can allow the light means to emit light out to a viewer. FIGS. 2-1 shows an alternative design of the front cover of FIG. 2 and can be varied as desired. FIGS. 2-2 sows the detailed construction of the inner side shown in FIG. 2.

Figure 3:
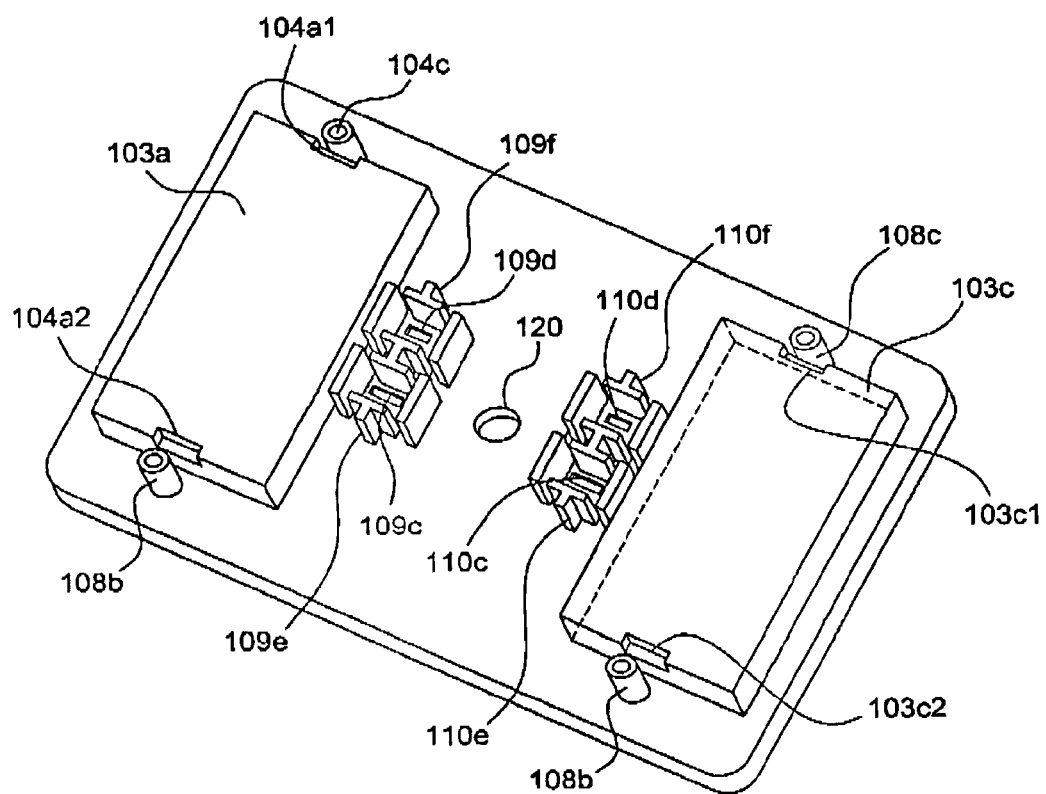
FIG. 3 is a perspective view of the inner side of the back plate of the preferred embodiment.

FIG. 3 shows in detail the construction of the preferred back case (101) of FIG. 1. The two refill compartments (103a) (103c) include screw stands (104c) (104b) (108c) (108b) to allow screws (not shown) to pass though and fasten with the front cover (not shown). The prong means are located at the prong holes (109c) (109d) (110c) (110d) which are surrounded by the walls (109e) (109f) (110e) (110f). The center screw hole (120) allows a longer screw (not shown) to pass through and be tightly fastened with the outlet device's screw holder.

The above discussed are not intended to limit the scope of the current invention. All alternatives, variations, equivalent functions, and minor changes still fall within the scope of the current invention. For example, the number of prong means can be at least one pair under some special requirements and still can supply power to two receptacles depending on the design of copper means/conductive means, and the copper means/conductive means also can be have any configuration as long as it supplies electricity as necessary. Furthermore, as described above, the light means may include any available light means and installation without departing from the scope of the current invention. The attachment means, fastening means, and installation means also may be varied without departing from the scope of the invention.

The invention claimed is:

1. A multiple function wall cover plate arranged to replace an existing wall plate, comprising:

at least one front cover and a back base assembled to the front cover to form said multiple function wall cover plate, said multiple function wall cover plate having a shape corresponding to that of the existing wall plate, wherein the multiple function wall cover plate is fastened by means of a screw extending through the front cover to a wall plate holder in place of the existing wall plate;

at least one copper means arranged to supply electricity from an existing receptacle mounted in said wall plate holder and covered by the multiple function wall cover plate to said at least one receptacle, said copper means installed in channels in the front cover and extending rearwardly from the front cover for insertion into said existing receptacle, said front cover including outlet openings for inserting prongs of said external device;

at least one light source installed within between said front cover and back base to emit light through said front cover and thereby provide a night light whenever the copper means is connected to the existing receptacle; and at least one fragrance refill replaceably installed on the back base.

2. A multiple function wall cover plate as claimed in claim 1, further comprising at least one heater means connected with the copper means for heating air adjacent the refill and thereby enhancing spreading of said fragrance.

3. A multiple function wall cover plate as claimed in claim 1, wherein said light source is selected from the group consisting of an electro-luminescent (E.L.) element, LED, neon light, black light, fluorescent light gas filled bulb, and incandescent light.

4. A multiple function wall cover plate as claimed in claim 1, wherein a number of said at least one receptacle is at least two.

5. A multiple function wall cover plate as claimed in claim 1, wherein a number of said at least one refill is at least two.

6. A multiple function wall cover plate as claimed in claim 1, wherein said copper means is arranged to supply electricity to circuitry for controlling said light means, as well as to said at least one receptacle.

7. A multiple function wall cover plate as claimed in claim 6, wherein a number of said at least one receptacle is at least two.

8. A multiple function wall cover plate as claimed in claim 1, wherein said copper means is connected to said existing receptacle by prongs and conductive means selected from the group consisting of wires, metal material, solder, resilient conductive means, and combination of wires, metal material, solder, or resilient conductive means.

9. A multiple function wall cover plate as claimed in claim 1, wherein said multiple function wall cover plate has dimensions of 12-18 cm by 7-12 cm.

10. A multiple function wall cover plate, comprising:

at least one front cover and a back base assembled to the front cover to form said multiple function wall cover plate, said multiple function wall cover plate having a shape corresponding to that of the existing wall plate, wherein the multiple function wall cover plate is fastened by means of a screw extending through the front cover to a wall plate holder in place of the existing wall plate;

at least one copper means arranged to supply electricity from an existing receptacle mounted in said wall plate holder and covered by the multiple function wall cover plate to said at least one receptacle, said copper means being installed in channels in the front cover and extending rearwardly from the front cover for insertion into said existing receptacle, said front cover including outlet openings for inserting prongs of an external device;

at least one light source installed within between said front cover and back base to emit light through said front cover and thereby provide a night light whenever the copper means is connected to the existing receptacle; and at least one additional electrical device.

11. A multiple function wall cover plate as claimed in claim 10, wherein said additional electrical device is selected from the group consisting of:
a. a fragrance dispenser;
b. a night light;
c. an insect repeller;
d. a time piece;
e. a motion sensor;
f. an infrared sensor; and
g. a blue tooth electrical device controller.

* * * * *